United States Patent
Lee et al.

(10) Patent No.: US 9,911,009 B2
(45) Date of Patent: Mar. 6, 2018

(54) DEVICE AND METHOD FOR PROVIDING SAFETY OF DATA BY USING MULTIPLE MODES IN DEVICE

(71) Applicant: Samsung Electronics Co., Ltd., Gyeonggi-do (KR)

(72) Inventors: Je-Won Lee, Gyeonggi-do (KR); Young-Kyoo Kim, Seoul (KR); Sung-Jo Oh, Gyeonggi-do (KR); Dong-Ho Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 22 days.

(21) Appl. No.: 14/187,856

(22) Filed: Feb. 24, 2014

(65) Prior Publication Data

US 2014/0245027 A1    Aug. 28, 2014

(30) Foreign Application Priority Data

Feb. 22, 2013 (KR) .................. 10-2013-0019506

(51) Int. Cl.
*G06F 21/62* (2013.01)
*G06F 21/74* (2013.01)

(52) U.S. Cl.
CPC .................. *G06F 21/74* (2013.01)

(58) Field of Classification Search
CPC .......... G06F 21/62; G06F 21/74; G06F 21/60; G06F 21/71
USPC ........................ 726/4, 26, 27; 713/189, 193
See application file for complete search history.

(56) References Cited

U.S. PATENT DOCUMENTS

| | | | | |
|---|---|---|---|---|
| 6,456,528 B1 * | 9/2002 | Chen | ...................... | G11C 11/56 365/185.03 |
| 6,726,094 B1 * | 4/2004 | Rantze | .................. | G06Q 20/20 235/379 |
| 7,437,574 B2 * | 10/2008 | Ronkka | .............. | G06F 21/6209 713/193 |
| 7,646,636 B2 * | 1/2010 | Kim | .................... | G06F 12/0246 365/168 |
| 8,009,566 B2 * | 8/2011 | Zuk | ..................... | H04L 63/1416 370/230 |
| 8,204,480 B1 | 6/2012 | Lindteigen et al. | | |
| 8,583,910 B2 * | 11/2013 | Smith | ................. | H04L 12/2803 380/278 |
| 2003/0046570 A1 * | 3/2003 | Ronkka | .............. | G06F 21/6209 713/193 |
| 2004/0255117 A1 * | 12/2004 | Paatero | .................. | G06F 21/62 713/166 |
| 2005/0097345 A1 * | 5/2005 | Kelley et al. | ................ | 713/200 |
| 2007/0174909 A1 * | 7/2007 | Burchett et al. | ................ | 726/18 |
| 2007/0296932 A1 * | 12/2007 | Suzuki | ................... | G03B 27/00 355/18 |
| 2008/0052532 A1 * | 2/2008 | Akkar | ................... | G06F 9/3004 713/189 |

(Continued)

*Primary Examiner* — Shanto M Abedin
(74) *Attorney, Agent, or Firm* — The Farrell Law Firm, P.C.

(57) ABSTRACT

A device and method for providing the security of data by using multiple modes in the device are provided. The device includes a storage unit that includes a normal mode data area and a security mode data area which is isolated from the normal mode data area and access to which is allowed only in a security mode; and a controller that processes data in the normal mode data area during a normal mode, and processes data in the security mode data area during the security mode.

15 Claims, 8 Drawing Sheets

(56) References Cited

U.S. PATENT DOCUMENTS

| | | | |
|---|---|---|---|
| 2009/0083520 A1* | 3/2009 | Kanemura | 712/43 |
| 2009/0094678 A1* | 4/2009 | Floman | G06K 19/07309 726/2 |
| 2009/0193524 A1* | 7/2009 | Shoji et al. | 726/27 |
| 2009/0292904 A1* | 11/2009 | Henry et al. | 712/223 |
| 2012/0079265 A1* | 3/2012 | Ferren | G02B 13/0065 713/100 |
| 2012/0330786 A1* | 12/2012 | Paleja et al. | 705/26.41 |
| 2013/0219508 A1* | 8/2013 | Lee | G06F 21/60 726/26 |
| 2013/0305354 A1* | 11/2013 | King et al. | 726/19 |
| 2014/0007222 A1* | 1/2014 | Qureshi et al. | 726/16 |
| 2014/0015987 A1* | 1/2014 | Harple | G06F 3/005 348/207.1 |
| 2014/0173747 A1* | 6/2014 | Govindaraju | 726/27 |

* cited by examiner ial No. 10-2013-0019506,
DEVICE AND METHOD FOR PROVIDING SAFETY OF DATA BY USING MULTIPLE MODES IN DEVICE

PRIORITY

This application claims priority under 35 U.S.C. § 119(a) to Korean Patent Application Serial No. 10-2013-0019506, which was filed in the Korean Intellectual Property Office on Feb. 22, 2013, the entire disclosure of which is incorporated herein by reference.

BACKGROUND

1. Field of the Invention

The present disclosure relates generally to a device and a method for providing safety of data in the device.

2. Description of the Related Art

Mobile devices such as mobile terminals and the like are configured to be capable of performing various functions. Examples of the various functions include a function of data and voice communication, a function of capturing a photograph and a moving image by using a camera, a function of storing a voice, a function of reproducing a music file through a speaker system, a function of displaying an image or a video, and the like. Some mobile devices are frequently used for personal purposes whereas other mobile devices may be implemented so as to be used for enterprise purposes or for business purposes.

Moreover, as mobile devices such as smart phones and tablet Personal Computers (PCs) become popular, a trend called Bring Your Own Device (BYOD) is becoming an issue. The term "BYOD" refers to the use of privately-owned devices (e.g., privately-owned laptop computers and smart phones) in business. Accordingly, there are increasing cases where devices are used not only for personal purposes but also for business purposes in workplaces. For example, there are increasing cases where each user uses a personal mobile device in various businesses, such as connecting to a business system by using the personal mobile device, reading an important document for business use by using the personal mobile device, and performing a telephone call for business use by using the personal mobile device.

In this regard, when personal mobile devices are used for business purposes, there is a need for security in order to protect information related to business. Accordingly, enterprises, which allow one device to be used for personal purposes and for business purposes, require a security solution to be installed in the one device, in order to enhance security when the one device is used for business purposes. For example, enterprises allow a security solution to be installed in a personal device that each user owns, and allow the personal device to be used for business purposes. Otherwise, the enterprises provide a device for business purposes, in which a security solution is installed, to each employee separately from a personal device, and allow each employee to use the device for business purposes. Therefore, security solution companies have developed security solutions to be installed in the devices for business purposes.

Examples of security solutions according to the related art include a security solution of a VMware (i.e., virtual machine software) scheme, a security solution of an application duplication scheme, a security solution of an Operating System (OS) division scheme, and the like.

A security solution of a VMware scheme employs a scheme which includes a virtual process executing an application in an area separately from a main process executing an application in a general area, and in which an application for business use is executed through the separated virtual process. A security solution of an OS division scheme employs a scheme in which different OSs are installed in one device, one OS executes a general application and the other OS executes an application for business use. A security solution of an application duplication scheme employs a scheme in which a general application and an application for business use, that a third party (or a third company) has reproduced for business use from a general application, are installed together in a device, the general application can be executed in a general area and the application for business use can be executed in an area for business use.

When the VMware scheme is applied to a device, the main process and the virtual process are both operated in one Central Processing Unit (CPU), and have their respective memory areas. As a result, the main process and the virtual process consume a lot of CPU resources and memory resources. Therefore, when the VMware scheme is used, CPU resources and memory resources that a user can individually use are reduced. Since a lot of CPU resources and memory resources are consumed, the performance of the device is degraded.

The OS division scheme is inefficient in that each of the two OSs uses memory resources in one device and a lot of memory resources are consumed. In addition, the OS division scheme is disadvantageous in that the two OSs have difficulty in interworking therebetween because the two OSs operate independently and each of the two OSs cannot receive a notification of data that the other OS is processing. Moreover, the OS division scheme is inefficient in that separate resources for interworking between the two OSs are needed in order to enable interworking between the two OSs.

Meanwhile, if the application duplication scheme is also inefficient in that each of a general application and an application for business use utilizes memory resources and a lot of memory resources are consumed. Also, the application duplication scheme is inconvenient in that a third party (or a third company) reproduces an application for business use from a general application and a user or an enterprise does not easily register and remove or modify the reproduced application for business use.

Therefore, the security solutions employing the above-described schemes are disadvantageous in that it is inappropriate to use the security solutions in such a manner as to be applied to BYOD.

SUMMARY

The present disclosure has been made to address at least the above-mentioned problems and/or disadvantages and to provide at least the advantages described below.

Accordingly, an aspect of the present invention provides a device and a method for providing safety of data by using multiple modes in the device, which provides security so as to enable the protection of information related to business and consumes a small amount of resources of the device when a personal device of a user is used for business purposes.

Another aspect of the present disclosure is to provide a device and a method for providing safety of data by using multiple modes in the device, which provides security so as to enable the protection of information related to business and consumes a small amount of resources of the device by using one application to process data in a normal data area during a normal mode and to process data in a security area during a security mode.

Still another aspect of the present disclosure is to provide an apparatus and a method for providing an application having multiple operating modes, which support a normal mode and a security mode with respect to an application so as to enable the protection of information related to business when a personal device of a user is used for business purposes.

Yet another aspect of the present disclosure is to provide an apparatus and a method for providing an application having multiple operating modes, which can provide security so as to enable the protection of information related to business and consumes a small amount of resources of the device, by converting an application into a multi-mode application, which processes data in a normal data area during a normal mode and processes data in a security area during a security mode, and providing the multi-mode application.

Still yet another aspect of the present disclosure is to provide an apparatus and a method for providing an application having multiple operating modes, which convert a general application into a multi-mode application so that one application can be used for personal purposes and for business purposes together.

In accordance with an aspect of the present disclosure, a device is provided which includes a storage unit that includes a normal mode data area and a security mode data area which is isolated from the normal mode data area and access to which is allowed only in a security mode; and a controller that processes data in the normal mode data area during a normal mode, and processes data in the security mode data area during the security mode.

In accordance with another aspect of the present disclosure, a method for providing security of data by using multiple modes in a device is provided. The method includes executing a multi-mode application; determining whether a mode of the device is a normal mode or a security mode; processing data in a normal mode data area when the mode of the device is the normal mode; and processing data in a security mode data area isolated from the normal mode data area, when the mode of the device is the security mode.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION OF EMBODIMENTS OF THE PRESENT INVENTION

Figure 1:
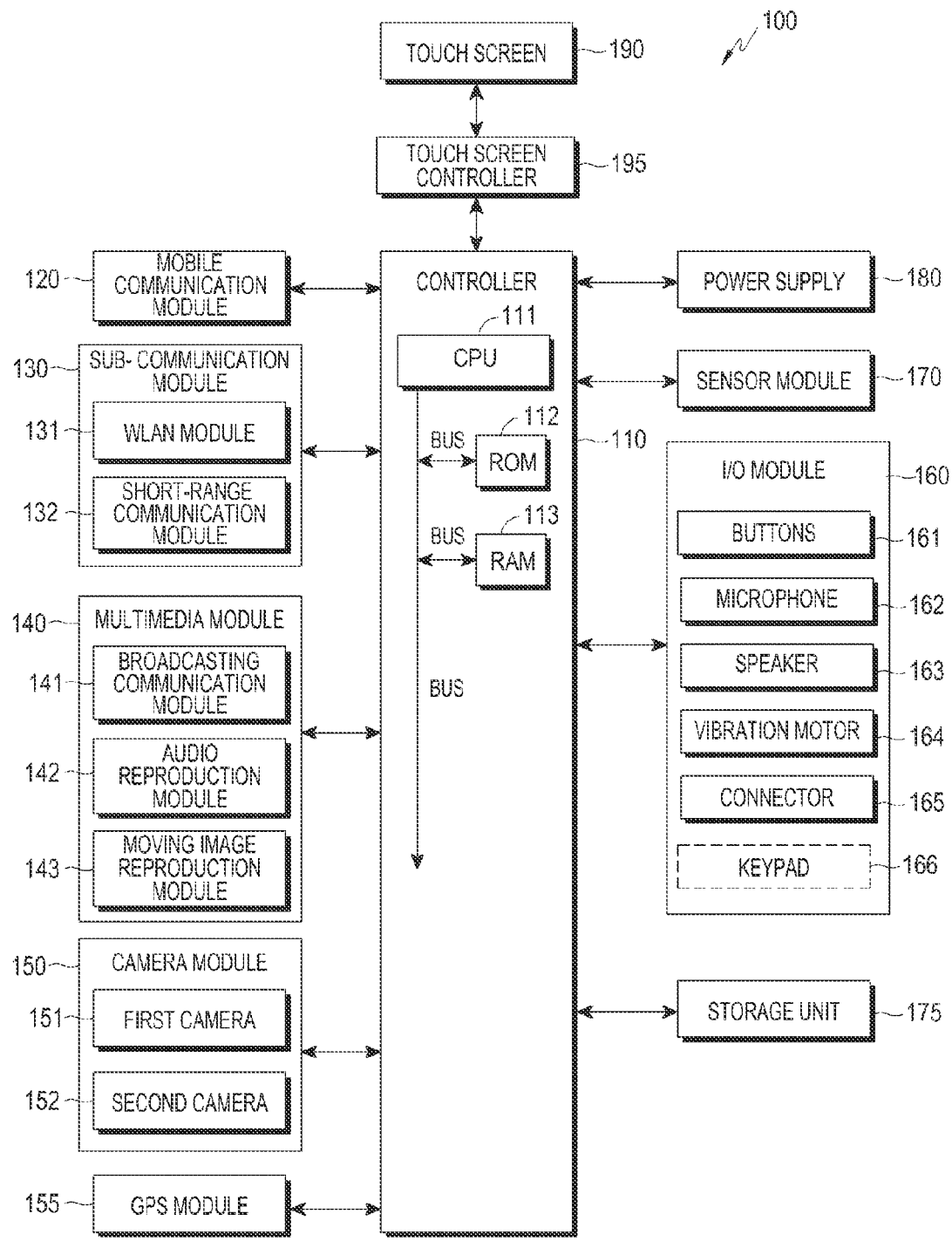
FIG. 1 is a block diagram schematically illustrating a configuration of a device according to an embodiment of the present disclosure.

The terms used herein have been selected in consideration of functions in the present disclosure and among the terms which are most widely used at present. However, the terms may be changed according to an intention of a technician who works in this field, a precedent, an appearance of a new technology or the like. Terms arbitrarily selected will be described in detail at the corresponding part in the description of the present disclosure. Thus, a term used herein should be defined based on the meaning of the term and the entire contents of the present disclosure rather than merely on the name expressed by the term.

In the entire specification of the present disclosure, when it is described that a certain unit "includes" a certain element, this means that the unit may include any other element rather than exclude the any other element unless otherwise described. In addition, the term, "xxx unit," "xxx module," or the like used herein means a unit that processes at least one function or operation and may be implemented in hardware, software, or a combination of hardware and software.

In the entire specification of the present disclosure, the term "application" refers to a series of computer program sets devised in order to perform particular functions. Applications described in this specification of the present disclosure may be various. Examples of the applications may include a mail application, a camera application, and the like. However, embodiments of the present disclosure are not limited thereto.

In the entire specification of the present disclosure, the term "multi-mode application" refers to an application having multiple operating modes, which processes data in a normal mode data area during a normal mode and processes data in a security mode data area during a security mode.

In the entire specification of the present disclosure, the term "general application" refers to an application which processes data without distinguishing between operation modes.

Hereinafter, various embodiments of the present disclosure will be described in detail with reference to the accompanying drawings. However, the present disclosure is not limited or restricted by the embodiments. The same reference numerals used in the drawings indicate the elements that perform substantially the same functions.

FIG. 1 is a block diagram schematically illustrating a configuration of a device according to an embodiment of the present disclosure.

Referring to FIG. 1, the device 100 may be a mobile terminal and the like, and may be connected to an external device by using a mobile communication module 120, a sub-communication module 130, and a connector 165. Examples of the external device may include another device, a mobile phone, a smart phone (a tablet PC, and a server.

Referring to FIG. 1, the device 100 includes a touch screen 190, and a touch screen controller 195. Also, the device 100 includes a controller 110, the mobile communication module 120, the sub-communication module 130, a multimedia module 140, a camera module 150, a Global Positioning System (GPS) module 155, an input/output (I/O) module 160, a sensor module 170, a storage unit 175, and a power supply unit 180. According to an embodiment of the present disclosure, the sub-communication module 130 includes at least one of a wireless Local Area Network (LAN) module 131 and a short-range communication module 132. The multimedia module 140 includes at least one of a broadcasting communication module 141, an audio reproduction module 142, and a moving image reproduction module 143. The camera module 150 includes at least one of a first camera 151 and a second camera 152. The input/output module 160 includes at least one a button 161, a microphone 162, a speaker 163, a vibration motor 164, the connector 165 and a keypad 166.

The controller 110 may include a Central Processing Unit (CPU) 111, a Read-Only Memory (ROM) 112 which stores a control program for controlling the device 100, and a Random Access Memory (RAM) 113 which stores a signal or data received from the outside of the device 100 or is used as a memory area for a task performed by the device 100. The CPU 111 may include multiple processors. For example, the CPU 111 may include a single-core processor, a dual-core processor, a triple-core processor, a quad-core processor, and the like. The CPU 111, the ROM 112 and the RAM 113 may be interconnected by an internal bus.

The controller 110 controls the mobile communication module 120, the sub-communication module 130, the multimedia module 140, the camera module 150, the GPS module 155, the input/output module 160, the sensor module 170, the storage unit 175, the power supply unit 180, the touch screen 190, and the touch screen controller 195.

According to the control of the controller 110, the mobile communication module 120 allows the device 100 to be connected to an external device through mobile communication by using at least one or more antennas. The mobile communication module 120 transmits and receives wireless signals for voice calls, video calls, Short Message Service (SMS) messages, Multimedia Messaging Service (MMS) messages, and the like to/from a mobile phone, a smart phone, a tablet PC or another device, which has a telephone number input to the device 100.

The sub-communication module 130 may include at least one of the wireless Local Area Network (LAN) module 131 and the short-range communication module 132. For example, the sub-communication module 130 may include one or both of the wireless LAN module 131 and the short-range communication module 132.

According to the control of the controller 110, the wireless LAN module 131 may be connected to the Internet at a place where a wireless Access Point (AP) is installed. The wireless LAN module 131 supports a wireless LAN standard (e.g., IEEE 802.11x of the Institute of Electrical and Electronics Engineers (IEEE)). According to the control of the controller 110, the short-range communication module 132 enables the device 100 to perform short-range wireless communication with an image forming device (not illustrated). Examples of a short-range communication scheme may include Bluetooth, Infrared Data Association (IrDA), and the like.

According to embodiments of the present disclosure, the device 100 may include at least one of the mobile communication module 120, the wireless LAN module 131 and the short-range communication module 132. For example, according to embodiments of the present disclosure, the device 100 may include a combination of the mobile communication module 120, the wireless LAN module 131 and the short-range communication module 132.

The multimedia module 140 may include the broadcasting communication module 141, the audio reproduction module 142, and/or a moving image reproduction module 143. According to the control of the controller 110, the broadcasting communication module 141 receives a broadcast signal (e.g., a TV broadcast signal, a radio broadcast signal, a data broadcast signal, etc.) and additional broadcast information (e.g., an Electronic Program Guide (EPG) or an Electronic Service Guide (ESG)), which are transmitted by a broadcast station through a broadcast communication antenna. According to the control of the controller 110, the audio reproduction module 142 reproduces stored or received digital audio files (e.g., a file having a file extension of mp3, wma, ogg, or way). According to the control of the controller 110, the moving image reproduction module 143 reproduces stored or received digital moving image files (e.g., a file having a file extension of mpeg, mpg, mp4, avi, mov, or mkv). The moving image reproduction module 143 may also reproduce digital audio files.

According to an embodiment of the present disclosure, the multimedia module 140 may include the audio reproduction module 142 and the moving image reproduction module 143, without including the broadcasting communication module 141. According to another embodiment of the present disclosure, the audio reproduction module 142 or the moving image reproduction module 143 of the multimedia module 140 may be included in the controller 100.

The camera module 150 includes at least one of the first camera 151 and the second camera 152, each for capturing a still image or a moving image according to the control of the controller 110. Also, the first camera 151 or the second camera 152 may include an auxiliary light source, such as a flash (not illustrated), which provides additional light to be used when capturing an image. The first camera 151 may be mounted on a front surface of the device 100, and the second camera 152 may be mounted on a rear surface of the device 100. Alternatively, the first camera 151 and the second camera 152 may be disposed adjacent to each other (e.g., a distance between the first camera 151 and the second camera 152 may be greater than 1 cm and is less than 8 cm), and, in such a configuration, the first camera 151 and the second camera 152 may capture a three-dimensional still image or a three-dimensional moving image.

The GPS module 155 receives a radio signal from each of multiple GPS satellites in the Earth's orbit, and calculates a location of the device 100 by using the Time Of Arrival (TOA) of the received radio signal from each of the GPS satellites to the device 100.

The input/output module 160 includes at least one input/output device, such as at least one of the buttons 161, the microphone 162, the speaker 163, the vibration motor 164, the connector 165 and the keypad 166.

The buttons 161 may be disposed on a front surface, a lateral surface or a rear surface of a housing of the device 100, and may include at least one of a power/lock button, a volume button, a menu button, a home button, a back button and a search button.

According to the control of the controller 110, the microphone 162 receives a voice or sound as input, and generates an electrical signal according to the received input.

According to the control of the controller 110, the speaker 163 outputs sounds matched to various signals (e.g., a wireless signal, a broadcast signal, a digital audio file, a digital moving image file, and photographing) from the mobile communication module 120, the sub-communication module 130, the multimedia module 140 and the camera module 150, to the outside of the device 100. The speaker 163 may output a sound (e.g., a button operation sound or a ring back tone matched to a telephone call) matched to a function that the device 100 performs. The device 100 may include multiple speakers. The speaker 163 or the multiple speakers may be disposed at an appropriate position or appropriate positions of the housing of the device 100 for directing output sounds.

According to the control of the controller 110, the vibration motor 164 converts an electrical signal into a mechanical vibration. For example, when the device 100 in a vibration mode receives a voice call from another device, the vibration motor 164 of the device 100 operates. The device 100 may include multiple vibration motors. The vibration motor 164 or the multiple vibration motors may be mounted within the housing of the device 100. The vibration motor 164 operates in response to a touch action of a user who touches the touch screen 190 and a continuous movement of a touch on the touch screen 190.

The connector 165 is used as an interface for connecting the device 100 to an external device or a power source. According to the control of the controller 110, through a wired cable connected to the connector 165, the device 100 transmits data stored in the storage unit 175 of the device 100 to an external device and/or receives data from the external device. Also, through the wired cable connected to the connector 165, the device 100 may be supplied with power from the power source or may charge a battery by using the power source.

The keypad 166 receives key input from the user in order to control the device 100. The keypad 166 includes a physical keypad mounted on the device 100 and/or a virtual keypad displayed on the touch screen 190. The physical keypad mounted on the device 100 may be omitted depending on the performance or structure of the device 100.

The sensor module 170 includes at least one sensor for detecting the state of the device 100. For example, the sensor module 170 may include a proximity sensor for detecting whether the user is close to the device 100, an illuminance sensor for detecting the amount of light around the device 100, a motion sensor for detecting the motion of the device 100 (e.g., the rotation of the device 100, or acceleration or vibration applied to the device 100), and the like. At least one sensor may detect the state of the device 100, may generate a signal matched to the detection, and may transmit the generated signal to the controller 110. According to the performance of the device 100, sensors may be added to or removed from the sensor module 170.

According to the control of the controller 110, the storage unit 175 may store a signal or data which is input/output in response to an operation of each of the mobile communication module 120, the sub-communication module 130, the multimedia module 140, the camera module 150, the GPS module 155, the input/output module 160, the sensor module 170, and the touch screen 190. The storage unit 175 stores a control program for controlling the device 100 or a control program for the controller 110, and applications.

The term "storage unit" may refer to any one of or a combination of the storage unit 175, the ROM 112 and the RAM 113 within the controller 110, or a memory card, such as a Secure Digital (SD) card or a memory stick, which is mounted on the device 100. The storage unit may include a non-volatile memory, a volatile memory, a Hard Disk Drive (HDD), a Solid State Drive (SSD), and the like.

According to the control of the controller 110, the power supply unit 180 may supply power to one or more batteries disposed in the housing of the device 100. The one or more batteries supply power to the device 100. Also, the power supply unit 180 may supply power provided by an external power source to the device 100 through a wired cable connected to the connector 165.

The touch screen 190 provides the user with a user interface matched to various services (e.g., telephone call, data transmission, broadcasting, and photography). The touch screen 190 transmits an analog signal matched to at least one touch, which is input to the user interface, to the touch screen controller 195. The touch screen 190 receives at least one touch as input from the user's body part (e.g., fingers) or an input means (e.g., a stylus pen) enabling a touch. Also, the touch screen 190 may receive, as input, a continuous movement of one touch. The touch screen 190 transmits an analog signal matched to a continuous movement of an input touch to the touch screen controller 195.

According to embodiments of the present disclosure, a touch is not limited to a contact between the touch screen 190 and the user's body part or the input means enabling a touch, but may include a non-contact (e.g., a case in which a detectable distance between the touch screen 190 and the user's body part or the input means enabling a touch is less than or equal to 1 mm). In the touch screen 190, a detectable distance may change depending on the performance or structure of the device 100.

The touch screen 190, for example, may be implemented as a resistive touch screen, a capacitive touch screen, an infrared touch screen, a surface acoustic wave touch screen, and/or the like.

The touch screen controller 195 converts an analog signal received from the touch screen 190 into a digital signal (e.g., X and Y coordinates), and provides the digital signal to the controller 110. The controller 110 controls the touch screen 190 by using the digital signal received from the touch screen controller 195. For example, the controller 110 may allow a shortcut icon displayed on the touch screen 190 to be selected or executed in response to the touch. According to embodiments of the present disclosure, the touch screen controller 195 may be included in the controller 110. The device 100 as configured above operates in a normal mode and in a security mode. The normal mode is used in a case where the device 100 is used for purposes which do not require security, whereas the security mode is used in a case where the device 100 is used for purposes which require security. For example, the normal mode is applied to a case where the device 100 is used for the user's personal purposes, and the security mode is applied to a case where the device 100 is used for business purposes in a business enterprise.

When the device 100 executes a multi-mode application, the device 100 which operates in a normal mode processes data in a normal mode data area, whereas the device 100 which operates in a security mode processes data in a security mode data area.

Figure 2:
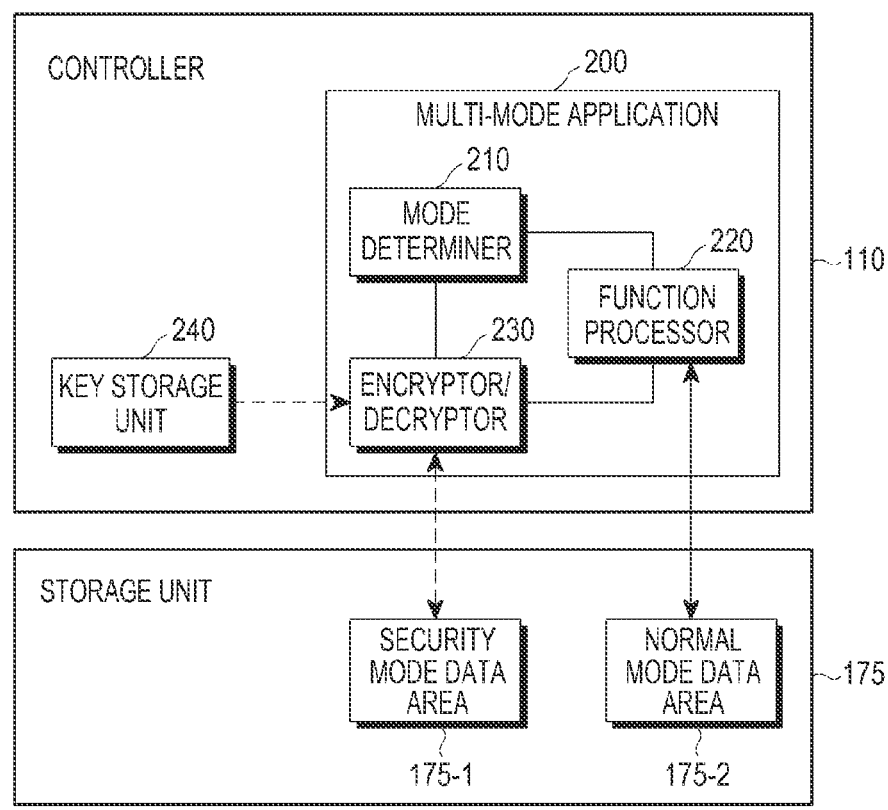
FIG. 2 is a view for describing a normal mode data area and a security mode data area according to an embodiment of the present disclosure.

FIG. 2 is a view for describing a normal mode data area and a security mode data area in a device according to an embodiment of the present disclosure.

Referring to FIG. 2, the device 100 includes a security mode data area 175-1 and a normal mode data area 175-2 within the storage unit 175. The normal mode data area 175-2 has data stored therein during a normal mode, and allows access to the stored data. In the security mode data area 175-1, data encrypted during a security mode is stored, and the security mode data area 175-1 allows access to the stored encrypted data. The security mode data area 175-1 is isolated from the normal mode data area 175-2. In the normal mode, access to the normal mode data area 175-2 is allowed, but access to the security mode data area 175-1 is not allowed. In the security mode, access to the normal mode data area 175-2 and access to the security mode data area 175-1 may be allowed, or only the access to the security mode data area 175-1 may be allowed.

The controller 110 of the device 100 executes a multi-mode application 200. The multi-mode application 200 includes a mode determiner 210, a function processor 220, and an encryptor/decryptor 230.

The mode determiner 210 determines whether the device 100 is in a normal mode or in a security mode. According to an embodiment of the present disclosure, a mode of the device 100 may be preset by a user or may be set according to predetermined mode condition. For example, according to the user's selection, a mode of the device 100 may be set to a normal mode or a security mode. Specifically, when the device 100 is located inside a business enterprise, the mode of the device 100 is set to the security mode. In contrast, when the device 100 is located outside the business enterprise, the mode of the device 100 is set to the normal mode.

The function processor 220 processes a function of an application by using general command codes processed in a normal mode and security command codes processed in a security mode.

When the function processor 220 needs to store data while processing a function of an application in a normal mode, the function processor 220 stores data in the normal mode data area 175-2. When the function processor 220 needs to access the stored data in the normal mode, the function processor 220 accesses the data stored in the normal mode data area 175-2. Also, when the function processor 220 senses a command for storing data in a security mode, the function processor 220 encrypts data using the encryptor/decryptor 230 and the key storage unit 240, and stores the encrypted data in the security mode data area 175-1. Specifically, when the function processor 220 needs to store data according to the execution of a storage function corresponding to a command code indicating the storage of data (e.g., a file, a database, or the like) while processing a function of an application in a security mode, the function processor 220 acquires a key for the encryption of data through a key storage unit 240, allows data to be encrypted by using the acquired key and the encryptor/decryptor 230, and allows the encrypted data to be stored in the security mode data area 175-1.

Also, when the function processor 220 senses a read command for reading the stored data in the security mode, the function processor 220 authenticates a user in a predetermined scheme. When the user is authenticated, the function processor 220 decrypts the encrypted data stored in the security mode data area 175-1 using the encryptor/decryptor 230 and the key storage unit 240, and provides the decrypted data. Specifically, the function processor 220 authenticates the user in a predetermined scheme according to the execution of a read function corresponding to a command for reading the data stored in the security mode data area 175-1. When the user is authenticated, the function processor 220 acquires a key for the decryption of data from key storage unit 240, and reads and decrypts the encrypted data stored in the security mode data area 175-1 by using the acquired key and the encryptor/decryptor 230.

Figure 3:
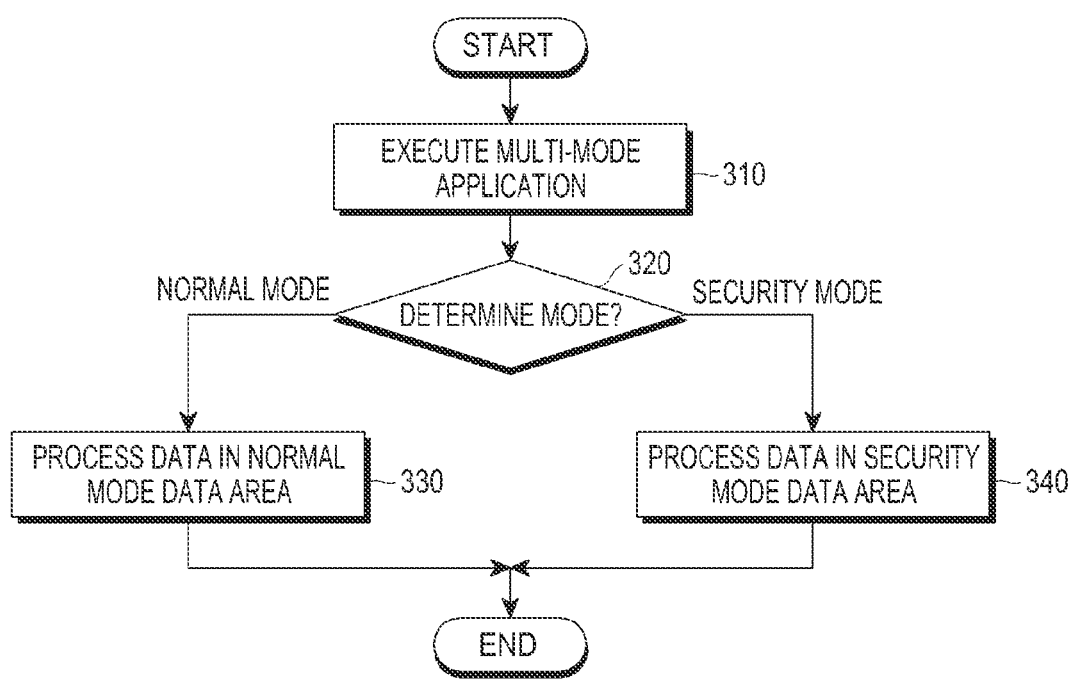
FIG. 3 is a flowchart illustrating a method for accessing a normal mode data area and a multi-mode data area according to an embodiment of the present disclosure.

FIG. 3 is a flowchart illustrating a method for accessing a normal mode data area 175-2 and a security mode data area 175-1 in a device 100 according to an embodiment of the present disclosure.

Referring to FIG. 3, in step 310, the device 100 executes the multi-mode application 200 according to input from a user. For example, when the user touches a multi-mode application icon displayed on the touch screen 190, the device 100 executes the relevant multi-mode application.

In step 320, the device 100 determines, through the mode determiner 210, whether a mode of the device 100 is a normal mode or a security mode during the execution of the multi-mode application 200.

In step 330, when the device 100 determines that the mode of the device 100 is the normal mode, the device 100 processes data in the normal mode data area 175-2. For example, the device 100 performs a relevant function by using normal mode command codes of the function processor 220. When the device 100 needs to store data while performing the relevant function, the device 100 stores data in the normal mode data area 175-2. When the device 100 needs to access the stored data, the device 100 accesses the data stored in the normal mode data area 175-2.

In step 340, when the device 100 determines that the mode of the device 100 is the security mode, the device 100 processes data in the security mode data area 175-1. For example, when the device 100 needs to store data according to the execution of a storage function corresponding to a command code indicating the storage of data (e.g., a file, a database, or the like) while processing a function of an application in a security mode, the device 100 acquires a key for the encryption of data through the key storage unit 240, allows data to be encrypted by using the acquired key and the encryptor/decryptor 230, and allows the encrypted data to be stored in the security mode data area 175-1. Also, the device 100 authenticates the user in a predetermined scheme according to the execution of a read function corresponding to a command for reading the data stored in the security mode data area 175-1. When the user is authenticated, the function processor 220 acquires a key from key storage unit 240 for the decryption of data, and reads and decrypts the encrypted data stored in the security mode data area 175-1 by using the acquired key and the encryptor/decryptor 230. At this time, the device 100 compares a pre-stored Hashed password and a password, which the user has input, with a Hashed password encrypted in a Hashed scheme. When the pre-stored Hashed password and the password, that the user has input, coincide with the Hashed password encrypted in the Hashed scheme, the device 100 can authenticate the user.

A multi-mode application is an application after being converted to process data in a normal mode data area during a normal mode and to process data in a security mode data area during a security mode.

For example, when a notification occurs while the device 100 executes the multi-mode application 200, the device 100 determines whether a mode of the device 100 is a normal mode or a security mode. When the mode of the device 100 is the normal mode, the device 100 displays information on the occurrence of the notification, stores the contents of the notification in the normal mode data area 175-2, and thereby enables the user to view the contents of the notification. When the mode of the device 100 is the security mode, the device 100 displays information on the occurrence of the notification, encrypts the contents of the notification, stores the encrypted contents of the notification in the security mode data area 175-1, and thereby enables the user to view the contents of the notification only in the security mode.

Also, the device 100 enables any one of multiple launchers to be executed in the security mode data area 175-1, and enables the other launchers to be executed in the normal mode data area 175-2. In the present example, a launcher may be a container application including multiple applications. When an application of each of multiple container applications is executed, applications of any one container application may process data in the normal mode data area 175-2, and applications of the other container applications may process data in the security mode data area 175-1. Also, the device 100 enables applications within an identical container application to process data in an identical data area. In contrast, the device 100 enables applications from among different container applications to process data in different data areas.

According to embodiments of the present disclosure, the device 100 may receive a multi-mode application generated by an external application provider, or may internally convert an application into a multi-mode application.

Figure 4:
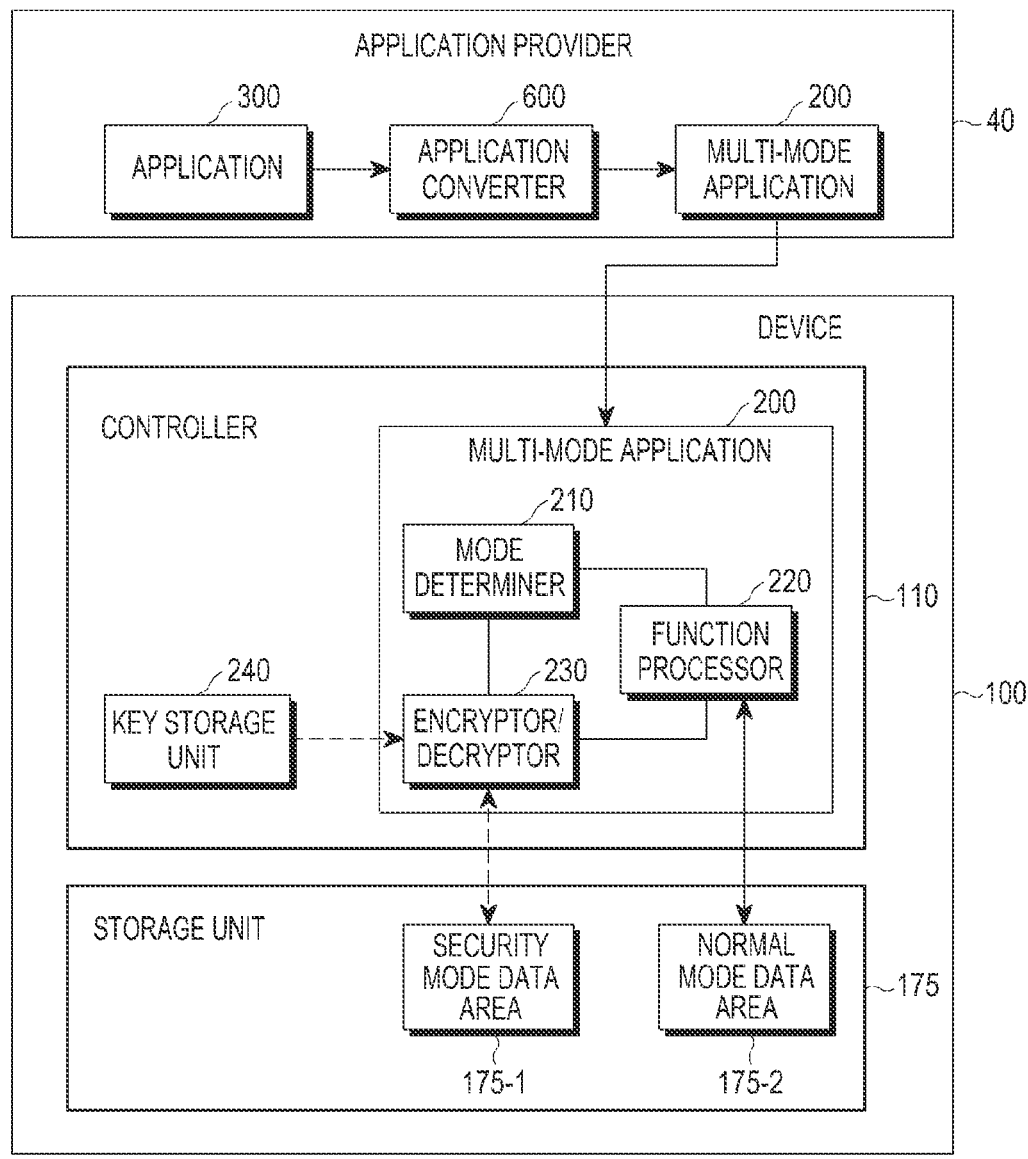
FIG. 4 is a view illustrating a case in which a device receives a multi-mode application generated by an external application provider according to an embodiment of the present disclosure.

FIG. 4 is a view illustrating a case in which a device 100 receives a multi-mode application from an external application provider according to an embodiment of the present disclosure.

Referring to FIG. 4, the application provider 40 converts an application 300 into the multi-mode application 200, which processes data in a normal mode data area during a normal mode and processes data in a security mode data area during a security mode, through an application converter 600 and provides the multi-mode application 200 to the device 100. The device 100 may download the multi-mode application 200 through wired/wireless communication, or may receive the multi-mode application 200 through an external device interface.

Figure 5:
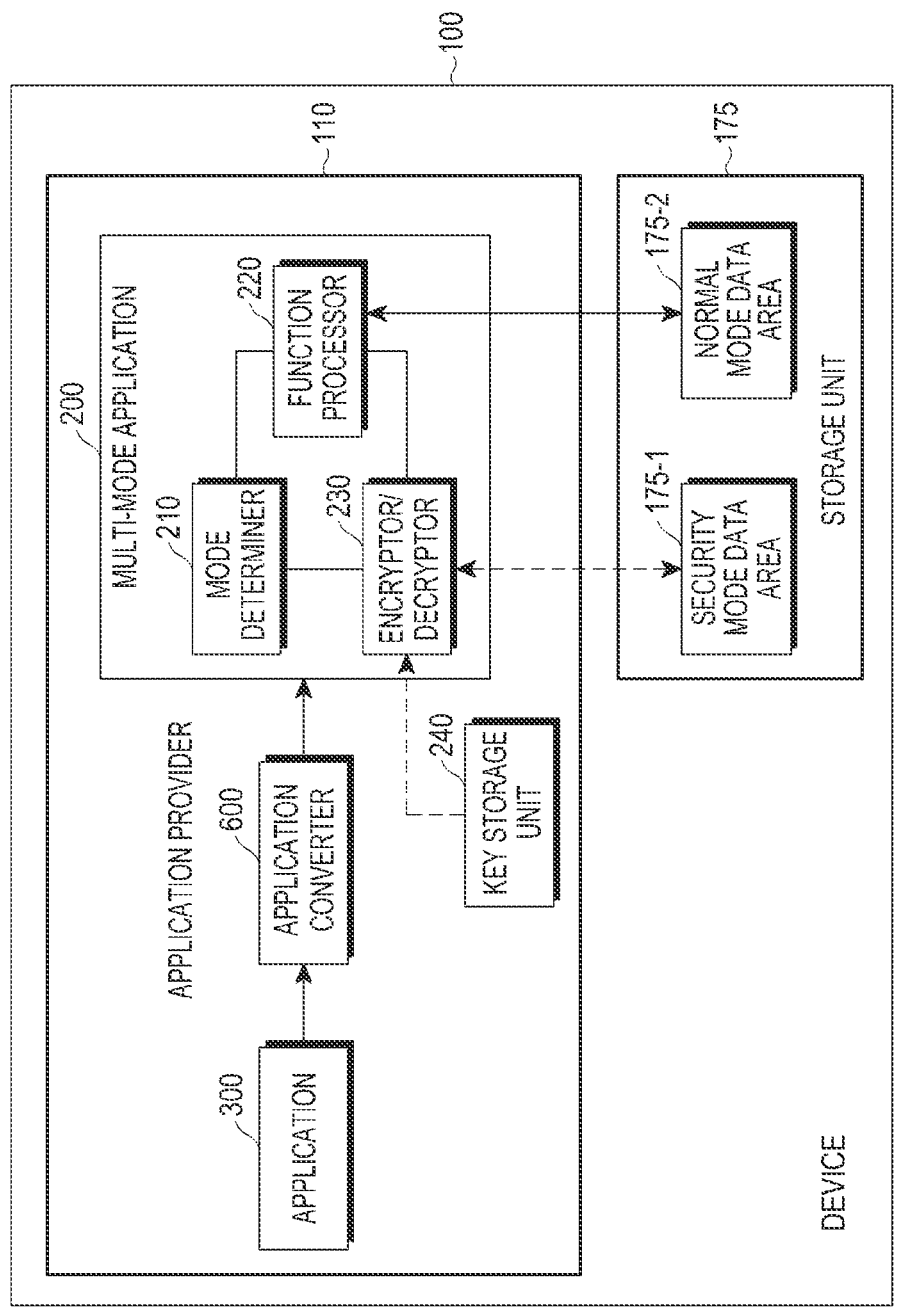
FIG. 5 is a view illustrating a case in which a device internally generates a multi-mode application according to an embodiment of the present disclosure.

FIG. 5 is a view illustrating a case in which a device 100 internally converts an application 300 into a multi-mode application 200 according to an embodiment of the present disclosure.

Referring to FIG. 5, the device 100 includes the application converter 600. The device 100 converts the application 300 into the multi-mode application 200, which processes data in a normal mode data area during a normal mode and processes data in a security mode data area during a security mode, through the application converter 600. In the present example, when the conversion of the application 300 into the multi-mode application 200 is completed, the application 300 may be deleted from the device 100.

Hereinafter, a more detailed description will be made of a configuration of an apparatus for providing an application having multiple operating modes, which converts the application 300 into the application having multiple operating modes (i.e., the multi-mode application 200) as described above. In embodiments of the present disclosure, an application converter is described as an example of the apparatus for providing an application having multiple operating modes.

Figure 6:
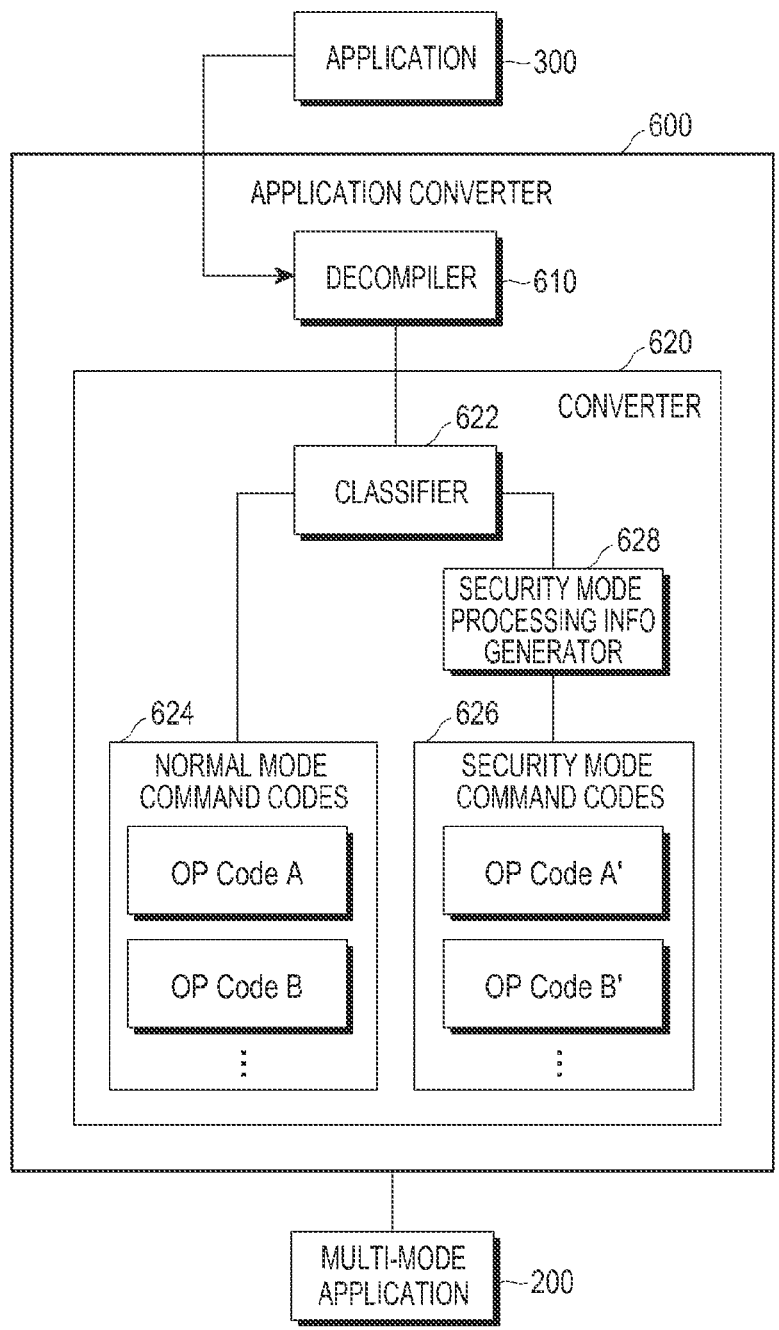
FIG. 6 illustrates a configuration of a multi-mode application converter according to a first embodiment of the present disclosure.

FIG. 6 illustrates a configuration of an application converter according to a first embodiment of the present disclosure. Referring to FIG. 6, the application converter 600 includes a decompiler 610 and a converter 620, and receives the application 300 and converts the received application 300 into the multi-mode application 200.

According to the first embodiment of the present disclosure, the application 300 input to the application converter 600 may be an executable file in the form of a binary file. For example, the application 300 may be a *.APK file which is a program file used in an Android OS. The *.APK file is a type of compressed file, and may include multiple executable files for executing an application.

Alternatively, the application 300 input to the application converter 600 may be a *.DEX file which is an executable file which can be included in the *.APK file. According to the first embodiment of the present disclosure, the *.DEX file may include source codes in a unit of function execution, which are written in Java language. Alternatively, the application 300 input to the application converter 600 may be a *.iap file which is an executable file used in an iPhone OS (i.e., iOS). Alternatively, the application 300 input to the application converter 600 may be a *.exe file or a *.dll file, which is an executable file used in a Windows OS. Alternatively, the application 300 input to the application converter 600 may be an executable file used in a Linux OS. Accordingly, examples of the application 300 input to the application converter 600 may include any files as long as the files are executable files although the devices 100 use different OSs.

The decompiler 610 decompiles a binary file of the application 300, and outputs source codes. According to the first embodiment of the present disclosure, when the binary file of the application 300, for example, is a file related to an Android platform, the decompiler 610 performs redex on a *.DEX file, and outputs source codes. Alternatively, when the binary file of the application 300 is a file executed in the iPhone OS (i.e., iOS), the decompiler 610 decompiles a *.iap file, and outputs relevant source codes. Alternatively, when the binary file of the application 300 is a file executed in the Windows OS, the decompiler 610 decompiles a *.exe file or a *.dll file, and outputs relevant source codes. Alternatively, when the binary file of the application 300 is a file executed in the Linux OS, the decompiler 610 decompiles the relevant executable file, and outputs relevant source codes. Accordingly, examples of the binary file of the application 300 may include any files as long as the files are executable files although the devices 100 use different OSs.

The converter 620 includes a classifier 622, normal mode command codes 624, security mode command codes 626, and a security mode processing information generator 628. The classifier 622 classifies the decompiled source codes into the normal mode command codes 624 and the security mode command codes 626. The normal mode command codes are related to commands to be executed in a normal mode, and the security mode command codes are related to commands to be executed in a security mode. For example, it is desirable that the security mode command codes are command codes having a function of storing data (e.g., a file, a database, or the like) or a function of accessing the stored data.

The security mode processing information generator 628 generates security mode processing information used to process the security mode command codes 626 in the security mode data area 175-1, and adds the generated security mode processing information to security mode command codes 626.

The converter 620 classifies command codes (e.g., OPeration (OP) Codes) for executing a function from among source codes of the application 300, into normal mode command codes (e.g., OP Code A, OP Code B, etc.) and security mode command codes (e.g., OP Code A', OP Code B', etc.). When the security mode command codes are executed, the security mode processing information generator 628 adds, to security mode command codes, security mode processing information used to process the security mode command codes in the security mode data area 175-1, and thereby the converter 620 is capable of converting a general application into a multi-mode application.

Meanwhile, the application converter 600 according to the first embodiment of the present disclosure is described as converting the application 300 into a multi-mode application having one security mode. However, the application converter 600 may convert the application 300 into a multi-mode application having multiple security modes.

Figure 7:
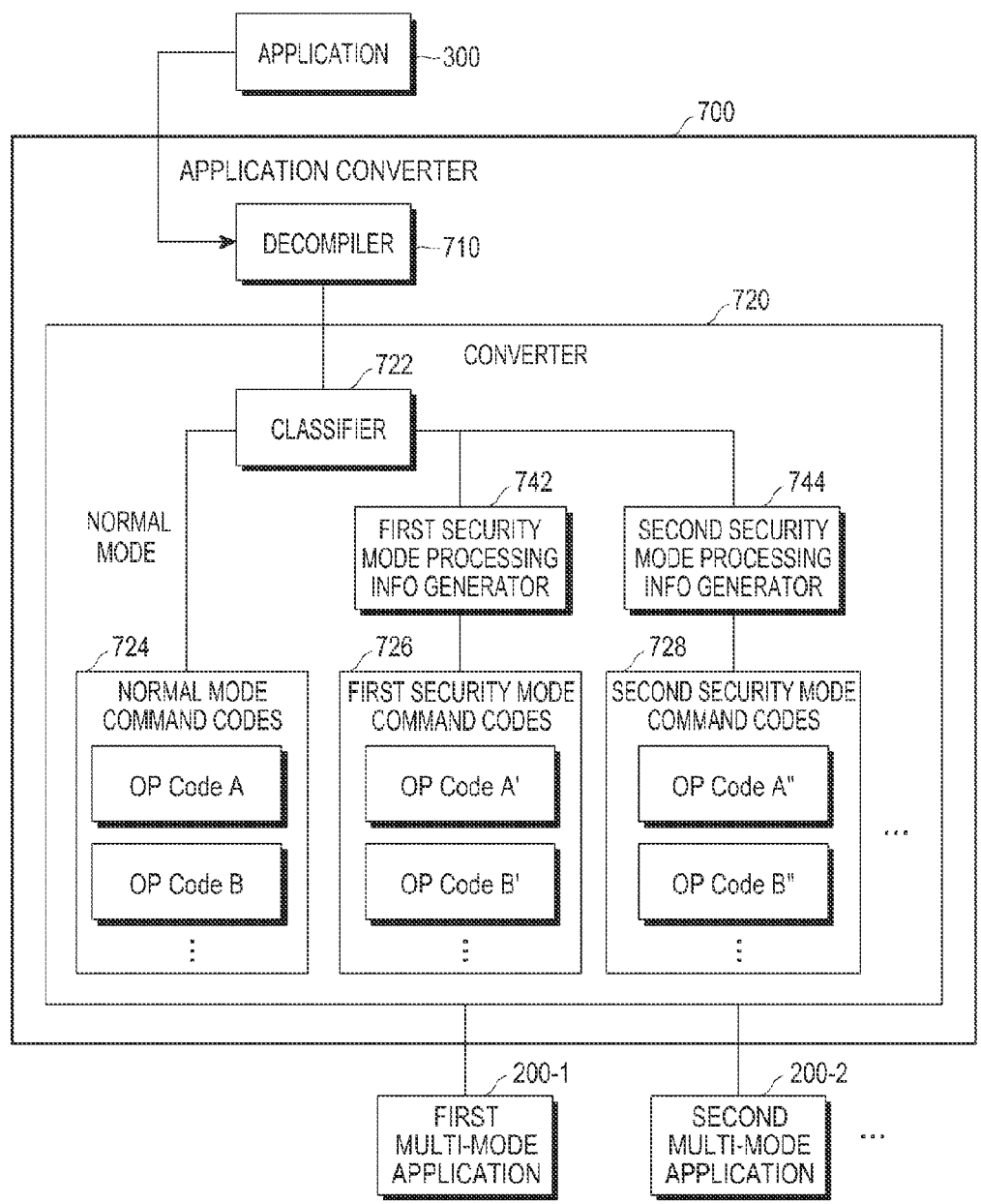
FIG. 7 illustrates a configuration of a multi-mode application converter according to a second embodiment of the present disclosure.

FIG. 7 illustrates a configuration of an application converter according to a second embodiment of the present disclosure. Referring to FIG. 7, the application converter 700 converts the application 300 into first multi-mode application 200-1 and second multi-mode application 200-2 capable of operating in a normal mode and multiple security modes, and outputs the multi-mode applications 200-1 and 200-2.

According to the second embodiment of the present disclosure, the application 300 input to the application converter 700 may be an executable file in the form of a binary file. For example, the application 300 may be a *.APK file which is a program file used in the Android OS. The *.APK file is a type of compressed file, and includes multiple executable files for executing an application.

Alternatively, the application 300 input to the application converter 700 may be a *.DEX file which is an executable file which can be included in the *.APK file. According to the second embodiment of the present disclosure, the *.DEX file may include source codes in a unit of function execution, which are written in Java language. Alternatively, the application 300 input to the application converter 700 may be a *.iap file which is an executable file used in the iPhone OS (i.e., iOS). Alternatively, the application 300 input to the application converter 700 may be a *.exe file or a *.dll file, which is an executable file used in the Windows OS. Alternatively, the application 300 input to the application converter 700 may be an executable file used in the Linux OS. Accordingly, examples of the application 300 input to the application converter 700 may include any files as long as the files are executable files although the devices 100 use different OSs.

A decompiler 710 decompiles a binary file of the application 300, and outputs source codes. According to the second embodiment of the present disclosure, the decompiler 710 performs redex on a *.DEX file, and outputs source codes. Alternatively, when the binary file of the application 300 is a file executed in the iPhone OS (i.e., iOS), the decompiler 710 decompiles a *.iap file, and outputs relevant source codes. Alternatively, when the binary file of the application 300 is a file executed in the Windows OS, the decompiler 710 decompiles a *.exe file or a *.dll file, and outputs relevant source codes. Alternatively, when the binary file of the application 300 is a file executed in the Linux OS, the decompiler 710 decompiles the relevant executable file, and outputs relevant source codes. Accordingly, examples of the binary file of the application 300 may include any files as long as the files are executable files although the devices 100 use different OSs.

The converter 720 includes a classifier 722, normal mode command codes 724, first security mode command codes 726, second security mode command codes 728, a first security mode processing information generator 742, and a second security mode processing information generator 744.

The classifier 722 classifies the decompiled source codes into the normal mode command codes 724, the first security mode command codes 726, and the second security mode command codes 728. The normal mode command codes are related to commands to be executed in a normal mode, the first security mode command codes are related to commands to be executed in a first security mode, and the second security mode command codes are related to commands to be executed in a second security mode. The first security mode and the second security mode are different types from each other. For example, when the first security mode is used to maintain security within a business enterprise, the second security mode may be used to maintain security at a particular department of the business enterprise. It is desirable that the first security mode command codes and the second security mode command codes are command codes related to the storage of data (e.g., a file, a database, or the like) or access to the stored data.

The first security mode processing information generator 742 generates first security mode processing information used to process the first security mode command codes 726 in the security mode data area 175-1 during the first security mode, and adds the first security mode processing information to the first security mode command codes 726. The second security mode processing information generator 744 generates second security mode processing information used to process the second security mode command codes 728 in the security mode data area 175-1 during the second security mode, and adds the second security mode processing information to the second security mode command codes 728. According to the second embodiment of the present invention, the security mode data area 175-1 may be divided into a first security mode data area (not illustrated) and a second security mode data area (not illustrated). The first security mode command codes 726 may be processed in the first security mode data area, and the second security mode command codes 728 may be processed in the second security mode data area.

A converter 720 classifies command codes (e.g., OP Codes) for executing a function from among source codes of the application 300, into normal mode command codes (e.g., OP Code A, OP Code B, etc.), first security mode command codes (e.g., OP Code A', OP Code B', etc.), and second security mode command codes (e.g., OP Code A", OP Code B", etc.). When the security mode command codes are executed, the converter 720 adds, to security mode command codes, first security mode processing information and second security mode processing information which are used to process the security mode command codes in the security mode data area 175-1, and thereby is capable of converting the application 300 into the first multi-mode application 200-1 and the second multi-mode application 200-2.

Figure 8:
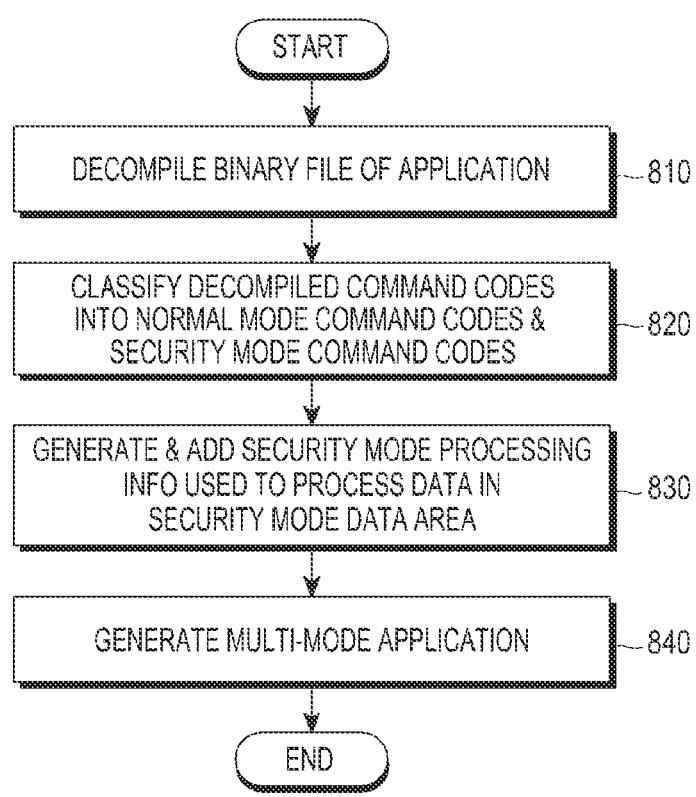
FIG. 8 is a flowchart illustrating a method for converting a general application into a multi-mode application according to an embodiment of the present disclosure.

FIG. 8 is a flowchart illustrating a method for providing an application having multiple operating modes according to an embodiment of the present disclosure. Referring to FIG. 8, as well as to FIG. 6, in step 810, the application converter 600 decompiles a binary file of an application through the decompiler 610.

In step 810, the application 300 input to the application converter 600 may be an executable file in the form of a binary file. For example, as described above, the application 300 may be a *.APK file which is a program file used in the Android OS. The *.APK file is a kind of compressed file, and may include multiple executable files for executing an application. Alternatively, the application 300 input to the application converter 600 may be a *.DEX file which is an executable file which can be included in the *.APK file. In this case, the *.DEX file may include source codes in a unit of function execution, which are written in Java language. Alternatively, the application 300 input to the application converter 600 may be a *.iap file which is an executable file used in the iPhone OS (i.e., iOS). Alternatively, the application 300 input to the application converter 600 may be a *.exe file or a *.dll file, which is an executable file used in the Windows OS. Alternatively, the application 300 input to the application converter 600 may be an executable file used in the Linux OS. Accordingly, examples of the application 300 input to the application converter 600 may include any files as long as the files are executable files although the devices 100 use different OSs.

The decompiler 610 decompiles a binary file of the application 300, and outputs source codes. In this case, the decompiler 610 performs redex on a *.DEX file, and outputs source codes. Alternatively, when the binary file of the application 300 is a file executed in the iPhone OS (i.e., iOS), the decompiler 610 decompiles a *.iap file, and outputs relevant source codes. Alternatively, when the binary file of the application 300 is a file executed in the Windows OS, the decompiler 610 decompiles a *.exe file or a *.dll file, and outputs relevant source codes. Alternatively, when the binary file of the application 300 is a file executed in the Linux OS, the decompiler 610 decompiles the relevant executable file, and outputs relevant source codes. Accordingly, examples of the binary file of the application 300 may include any files as long as the files are executable files although the devices 100 use different OSs.

In step 820, the application converter 600 classifies command codes for executing a function from among the decompiled source codes, into normal mode command codes and security mode command codes. For example, the application converter 600 classifies OP Codes from among the decompiled source codes, into normal mode command codes (e.g., OP Code A, OP Code B, etc.) and security mode command codes (e.g., OP Code A', OP Code B', etc.). In step 820, it is desirable that the security mode command codes are command codes including a function of storing data (e.g., a file, a database, or the like) or a function of accessing the stored data.

In step 830, the application converter 600 generates security mode processing information used to process data in a security mode data area, and adds the generated security mode processing information. Specifically, when the security mode command codes are executed, the application converter 600 generates, through the security mode processing information generator 628, security mode processing information used to process security mode command codes in the security mode data area 175-1, and adds the generated security mode processing information to the security mode command codes. In step 830, the application converter 600 includes a screenshot corresponding to each normal mode in the security mode processing information so as to enable discrimination between a normal mode and a security mode, and thereby allows the multi-mode application 200 to have a screenshot in each mode.

In step 840, the application converter 600 converts the general application 300 into an application having multiple operating modes (i.e., the multi-mode application 200) by using the normal mode command codes and the security mode command codes.

The multi-mode application 200 can be executed by the device 100. When the multi-mode application 200 is executed, the device 100 processes data in the normal mode data area 175-2 during the normal mode, and processes data in the security mode data area 175-1 during the security mode.

According to various embodiments of the present disclosure, when the personal device 100 of the user is used for business purposes, security can be provided so as to enable the protection of information related to the business, and it is possible to reduce the consumption of resources of the personal device 100. Also, according to various embodiments of the present disclosure, one multi-mode application is used to process data in a normal mode data area during a normal mode and to process data in a security mode data area during a security mode, and thereby all data can be accessed in the security mode but data in the security mode cannot be accessed in the normal mode, so that complete protection of access to data in the security area can be provided.

According to various embodiments of the present disclosure, the application 300 is converted into the multi-mode application 200 so as to operate in a normal mode and in a security mode, and thereby one multi-mode application can not only have different screenshots in each normal mode and in each security mode but also can provide screenshots, which are distinguished according to a mode, to the user.

According to various embodiments of the present disclosure, an application that a consumer (e.g., a corporate customer or a user) wants is immediately converted into a multi-mode application, which supports a normal mode and a security mode together, inside or outside the device 100 so as to enable the consumer to use the multi-mode application whenever the consumer wants to.

According to various embodiments of the present disclosure, one multi-mode application supports a normal mode and a security mode together. Accordingly, with respect to an identical notification in a case where a notification occurs while the device performs a function of an application, the contents of the notification can be protected by enabling the user to view the contents of the notification together with information on the occurrence of the notification during a normal mode and by allowing the user to view only the information on the occurrence of the notification during a security mode.

According to various embodiments of the present disclosure, data is processed in a normal mode data area during a normal mode whereas data is processed in a security mode data area during a security mode. In this regard, when an application of each of multiple launchers is executed, for example, when an application of each of multiple container applications is executed, applications of any one container application are capable of processing data in the normal mode data area, and applications of the other container applications are capable of processing data in the security mode data area. As a result, data can be processed in such a manner as to completely isolate data of a container application from that of another container application. Also, applications within an identical container application are capable of processing data in an identical data area, and thus are capable of processing data while sharing the data.

According to various embodiments of the present disclosure, when a business enterprise intends to delete security data related to business from the device, the enterprise can delete only data in a security mode data area, and thus does not have to delete data (e.g., personal information of a user) in a normal mode data area. Also, because the security mode data area is distinguished from the normal mode data area, it is possible to reduce a risk such that the personal information, for example, is fabricated by a policy or is monitored by the enterprise.

According to various embodiments of the present disclosure, an application itself is converted into a multi-mode application so as to operate in a normal mode and in a security mode. Accordingly, it is convenient that one application can not only have a screenshot different for each mode but also can provide screenshots, which are distinguished according to a mode, to the user.

According to various embodiments of the present disclosure, by providing the application converter which converts an application into a multi-mode application supporting a normal mode and a security mode, an application that a consumer (e.g., a corporate customer or a user) wants is immediately converted into the multi-mode application, which supports the security mode, inside or outside the device so as to enable the consumer to use the multi-mode application whenever the consumer wants to.

The methods according to the embodiments of the present disclosure may be in a form of program commands executed through various computer means to be recorded in a computer readable medium. The computer-readable medium may include a program command, a data file, and a data structure individually or a combination thereof. The program command recorded in the medium may be designed and configured specifically in accordance with present disclosure or may be known and used by those skilled in the computer software field.

While the present disclosure has been shown and described with reference to certain embodiments thereof, it will be understood by those skilled in the art that various changes in form and detail may be made therein without departing from the spirit and scope of the invention as defined by the appended claims.

What is claimed is:

1. A device comprising:
    a storage unit that includes a normal mode data area and a security mode data area which is distinguishable from the normal mode data area and access to which is allowed in a security mode;
    a controller including a central processing unit that processes data in the normal mode data area during a normal mode, and processes data in the security mode data area during the security mode,
    wherein the controller converts an application of the device into a multi-mode application, which processes data in the normal mode data area during the normal mode and processes data in the security mode data area during the security mode, executes the multi-mode application, and determine whether a mode of the device is the normal mode or the security mode, and
    a converter that adds security mode processing information, which is used to process the security mode command codes in the security mode data area distinguished from the normal mode data area, to the security mode command codes.

2. The device as claimed in claim 1, wherein the controller controls to encrypt or decrypt the data when the mode of the device is the security mode.

3. The device as claimed in claim 2, wherein the controller controls to encrypt the data and store the encrypted data in the security mode data area, if the controller senses a command for storing data when the mode of the device is the security mode.

4. The device as claimed in claim 3, wherein the controller authenticates a user when the function processor senses a read command, and decrypts the encrypted data stored in the security mode data area and provides the decrypted data after the function processor authenticates the user.

5. The device as claimed in claim 1, wherein the device receives the multi-mode application from outside of the device.

6. The device as claimed in claim 1, comprising:
    a decompiler that decompiles a binary file of the application, and outputs source codes corresponding to a command; and
    a converter that classifies the source codes into normal mode command codes and security mode command codes and converts the application into a multi-mode application, when the security mode command codes are executed.

7. The device as claimed in claim 6, wherein the converter comprises:
    a classifier that classifies the source codes into the normal mode command codes and the security mode command codes; and
    a security mode processing information generator that is set so as to generate the security mode processing information.

8. The device as claimed in claim 6, wherein the security mode command codes have a function of storing the data or a function of accessing the stored data.

9. The device as claimed in claim 6, wherein the binary file of the application comprises at least one of:
    a *.APK file;
    a *.EXE file;
    a *.DLL file;
    a *.DEX file; and
    a *.iap file.

10. A method for providing security of data by using multiple modes in a device, the method comprising:
    using a controller including a processor to perform:
    converting an application of the device into a multi-mode application, which processes data in a normal mode data area during a normal mode and processes data in a security mode data area during a security mode;
    executing the multi-mode application;
    determining whether a mode of the device is the normal mode or the security mode;
    processing data from a storage unit including the normal mode data area when the mode of the device is the normal mode;
    processing data from the storage unit including the security mode data area which is distinguishable from the normal mode data area, when the mode of the device is the security mode; and
    adding security mode processing information, which is used to process the security mode command codes in the security mode data area distinguished from the normal mode data area, to the security mode command codes.

11. The method as claimed in claim 10, wherein processing the data in the security mode data area comprises encrypting the data and storing the encrypted data in the security mode data area, when a command for storing data is sensed.

12. The method as claimed in claim 11, wherein processing the data in the security mode data area comprises:
    authenticating a user when a read command is sensed; and
    decrypting the encrypted data stored in the security mode data area when the user is authenticated.

13. The method as claimed in claim 10, further comprising:
    decompiling a binary file of the application, and outputting source codes corresponding to a command;
    classifying the source codes into normal mode command codes and security mode command codes; and
    converting the application into the multi-mode application, when the security mode command codes are executed.

14. The method as claimed in claim 13, wherein the security mode command codes include command codes having a function of storing the data or a function of accessing the stored data.

15. The method as claimed in claim 13, wherein the binary file of the application comprises at least one of:
   a *.APK file;
   a *.EXE file;
   a *.DLL file;
   a *.DEX file; and
   a *.iap file.

* * * * *